(12) United States Patent
Maximo

(10) Patent No.: US 9,501,810 B2
(45) Date of Patent: Nov. 22, 2016

(54) CREATING A VIRTUAL ENVIRONMENT FOR TOUCHLESS INTERACTION

(71) Applicant: General Electric Company, Schenectady, NY (US)

(72) Inventor: Andre de Almeida Maximo, Rio de Janeiro (BR)

(73) Assignee: General Electric Company, Schenectady, NY (US)

(*) Notice: Subject to any disclaimer, the term of this patent is extended or adjusted under 35 U.S.C. 154(b) by 113 days.

(21) Appl. No.: 14/485,407

(22) Filed: Sep. 12, 2014

(65) Prior Publication Data

US 2016/0078679 A1    Mar. 17, 2016

(51) Int. Cl.

| | | |
|---|---|---|
| *G09G 5/02* | (2006.01) | |
| *G06T 3/00* | (2006.01) | |
| *G06F 3/01* | (2006.01) | |
| *G06T 7/00* | (2006.01) | |
| *G06K 9/00* | (2006.01) | |

(52) U.S. Cl.
CPC ............... *G06T 3/00* (2013.01); *G06F 3/017* (2013.01); *G06T 7/0081* (2013.01); *G06K 9/00355* (2013.01)

(58) Field of Classification Search
CPC .................................................. G06T 7/0085
USPC ......................................................... 345/633
See application file for complete search history.

(56) References Cited

U.S. PATENT DOCUMENTS

| | | |
|---|---|---|
| 8,139,029 B2 | 3/2012 | Boillot et al. |
| 8,334,841 B2 | 12/2012 | Boillot et al. |
| 8,527,894 B2 * | 9/2013 | Hughes ................. G06F 3/0481 345/168 |
| 8,578,282 B2 | 11/2013 | Boillot |

(Continued)

FOREIGN PATENT DOCUMENTS

| | | | | |
|---|---|---|---|---|
| DE | WO 2014183792 A1 * | 11/2014 | ............. | A61F 9/008 |
| GB | WO 2013132241 A2 * | 9/2013 | ........... | G06F 1/3262 |

(Continued)

OTHER PUBLICATIONS

Colaco, Andrea, "Sensor Design and Interaction Techniques for Gestural Input to Smart Glasses and Mobile Devices", UIST'13, Doctoral Consortium/Symposium Submissions, St. Andrews, UK, MIT Media Lab, (Oct. 8, 2013), 49-52.

(Continued)

*Primary Examiner* — Javid A Amini
(74) *Attorney, Agent, or Firm* — Schwegman Lundberg & Woessner, P.A.

(57) ABSTRACT

This disclosure is directed to a touchless interactive environment. An input device may be configured to capture electronic images corresponding to physical objects detectable within a physical three-dimensional region. A computer system may establish a virtual three-dimensional region mapped to the physical three-dimensional region, with the virtual three-dimensional region defining a space where a plurality of virtual objects are instantiated based on the plurality of electronic images. The computer system may select a virtual object from the plurality of virtual objects as one or more commanding objects, with the one or more commanding objects indicating a command of a graphical user interface to be performed based on a position of the one or more commanding objects. The computer system may then perform the command of the graphical user interface based on the position of the one or more commanding objects.

19 Claims, 11 Drawing Sheets

(56) References Cited

U.S. PATENT DOCUMENTS

| | | | |
|---|---|---|---|
| 8,612,894 B2 | 12/2013 | Kim | |
| 8,614,669 B2 | 12/2013 | Marc | |
| 8,643,628 B1 | 2/2014 | Eriksson et al. | |
| 8,907,929 B2 * | 12/2014 | Li | G01S 7/5273 345/177 |
| 9,081,177 B2 * | 7/2015 | Wong | G02B 27/0093 |
| 9,209,833 B1 * | 12/2015 | Maximo | H03M 7/405 |
| 2007/0120996 A1 * | 5/2007 | Boillot | G06F 3/017 348/345 |
| 2007/0126696 A1 * | 6/2007 | Boillot | G06F 3/017 345/156 |
| 2007/0130547 A1 * | 6/2007 | Boillot | G06F 3/017 715/863 |
| 2007/0211023 A1 * | 9/2007 | Boillot | G06F 3/017 345/156 |
| 2007/0220437 A1 * | 9/2007 | Boillot | G06F 8/34 715/762 |
| 2007/0288194 A1 * | 12/2007 | Boillot | G06F 3/0304 702/150 |
| 2008/0048878 A1 * | 2/2008 | Boillot | G06F 3/017 340/686.1 |
| 2008/0059915 A1 * | 3/2008 | Boillot | G06F 3/0346 715/863 |
| 2008/0111710 A1 * | 5/2008 | Boillot | G06F 3/0346 341/22 |
| 2008/0252595 A1 * | 10/2008 | Boillot | G06F 3/011 345/156 |
| 2010/0188337 A1 * | 7/2010 | Westphal | G06F 3/03543 345/166 |
| 2011/0029913 A1 * | 2/2011 | Boillot | A61B 19/5244 715/776 |
| 2011/0041100 A1 * | 2/2011 | Boillot | G06F 3/011 715/863 |
| 2012/0001875 A1 | 1/2012 | Lee et al. | |
| 2012/0068956 A1 * | 3/2012 | Jira | B60K 37/06 345/174 |
| 2012/0113241 A1 * | 5/2012 | Sundaresan | G06F 3/017 348/77 |
| 2013/0097563 A1 * | 4/2013 | Pacheco Rodrigues Velho | G06F 3/04815 715/850 |
| 2013/0147770 A1 * | 6/2013 | Dahl | G06F 1/3215 345/177 |
| 2013/0257718 A1 * | 10/2013 | Ojelund | A61C 9/004 345/156 |
| 2014/0028632 A1 * | 1/2014 | Thielemann | G06F 3/0416 345/177 |
| 2014/0118276 A1 * | 5/2014 | Chiu | G06F 3/0416 345/173 |
| 2014/0207467 A1 * | 7/2014 | White | G10L 15/24 704/275 |
| 2014/0313122 A1 * | 10/2014 | Tang | G06F 3/0317 345/156 |
| 2014/0368472 A1 * | 12/2014 | Bang | G06F 1/3262 345/175 |
| 2015/0002478 A1 * | 1/2015 | Bang | G06F 3/0418 345/177 |
| 2015/0062073 A1 * | 3/2015 | Heikel | G06F 3/041 345/174 |
| 2015/0205358 A1 * | 7/2015 | Lyren | G06F 3/0484 715/765 |
| 2015/0220776 A1 * | 8/2015 | Cronholm | G06F 3/017 382/103 |
| 2015/0234454 A1 * | 8/2015 | Kurz | G06F 3/011 345/156 |
| 2015/0268754 A1 * | 9/2015 | Chang | G09G 3/3413 345/175 |
| 2015/0290031 A1 * | 10/2015 | Wellhoefer | A61F 9/008 345/156 |
| 2015/0301696 A1 * | 10/2015 | D' Jesus Bencci | G06F 3/0482 715/752 |
| 2015/0363003 A1 * | 12/2015 | Henriz | G06F 3/0481 345/156 |
| 2015/0363004 A1 * | 12/2015 | Cronholm | G06F 3/011 345/156 |
| 2016/0011672 A1 * | 1/2016 | Strutt | G06F 3/017 715/702 |
| 2016/0026340 A1 * | 1/2016 | Dahl | G06F 3/011 345/177 |

FOREIGN PATENT DOCUMENTS

| | | | | |
|---|---|---|---|---|
| GB | WO 2014125294 A1 * | 8/2014 | | G06F 3/011 |
| SE | WO 2014116167 A1 * | 7/2014 | | G06F 3/011 |
| SE | WO 2014116168 A1 * | 7/2014 | | G06F 3/017 |
| WO | WO-2013132242 A1 | 9/2013 | | |
| WO | WO-2014000129 A1 | 1/2014 | | |

OTHER PUBLICATIONS

Foley, James D, et al., "Chapter 5: Geometrical Transformations", Computer Graphics: Principles and Practice in C (2nd Edition), Addison-Wesley Professional, (Aug. 14, 1995), 204-226.

Foley, James D, et al., "Chapter 6: Viewing in 3D", Computer Graphics: Principles and Practice in C (2nd Edition), (Aug. 14, 1995), 242-281.

Mistry, Pranav, et al., "Mouseless", Adjunct Proceedings of the 23nd Annual ACM Symposium on User Interface Software and Technology (UIST '10), (2010), 441-442.

Mistry, Pranav, et al., "SixthSense: a wearable gestural interface", ACM SIGGRAPH ASIA 2009 Sketches (SIGGRAPH ASIA '09), Article 11, (2009), 1 pg.

* cited by examiner

CREATING A VIRTUAL ENVIRONMENT FOR TOUCHLESS INTERACTION

TECHNICAL FIELD

The subject matter disclosed herein generally relates to a system, method, and computer-readable medium for creating a virtual environment for touchless interaction. In particular, the disclosed subject matter relates to capturing images of an object in a physical three-dimensional region and translating the position of the object in the physical three-dimensional region into a command understandable by a graphical user interface (GUI).

BACKGROUND

A computer system may have an input device, such as a mouse, to receive input and also a display to output information. The mouse may be used on a flat, two-dimensional surface, and the movements performed on it may be replicated to the display in the form of a cursor moving on a two-dimensional plane. In effect, the two-dimensional plane mimics the surface that the mouse is on and the cursor mimics the current position of the mouse on the surface. The visual feedback of the cursor on the display may include an image, such as the image of an arrow. The action of manipulating the mouse, such as pressing a button or scrolling a wheel, may cause the mouse to provide input commands to the computer system in correlation with the current cursor position. The computer system may display which commands are acceptable by way of a GUI displayed on the display.

While a mouse is one type of tactile input device, other tactile input devices may also be used to provide input to the computer system, such as a touchpad, trackball, pointing stick, or touchscreen. Each of these tactile input devices require some kind of physical interaction, e.g., that the user physically touch the input device. However, there are scenarios where physical interaction with the input device may be difficult or impossible, such as an industrial environment, where workers use protective equipment that may hinder the physical interaction with a computer system or, in a healthcare facility, where medical doctors and assistants cannot touch unsterilized objects.

BRIEF DESCRIPTION OF THE DRAWINGS

Some embodiments are illustrated by way of example and not limitation in the figures of the accompanying drawings.

DETAILED DESCRIPTION

Figure 1:
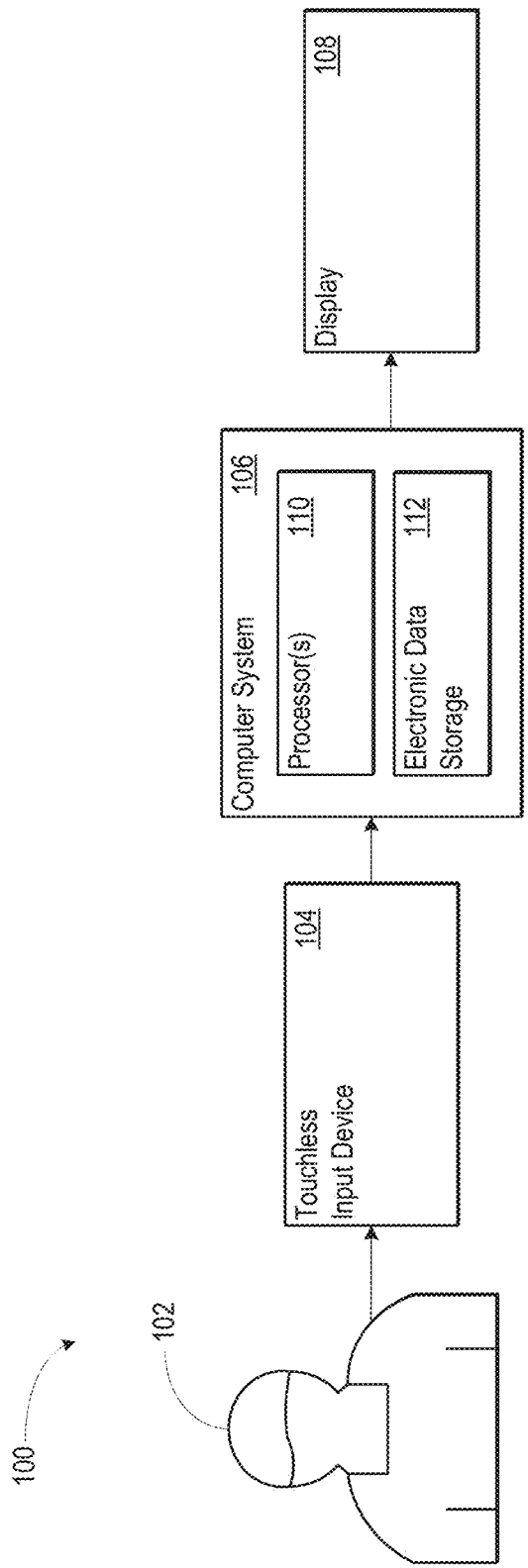
FIG. 1 is a block diagram of a system for creating a touchless interaction environment, in accordance with an example embodiment.

Example methods and systems are directed to creating a virtual environment, in accordance with an example embodiment for use with a touchless input device. Several commercially available touchless input devices are available on the market, such as the Microsoft® Kinect® camera and the Leap Motion® device. The Microsoft® Kinect® camera is an input device that includes a red-green-blue (RGB) camera, a depth sensor, and a multi-array microphone, which allows facial recognition and voice recognition to be performed by a connected system. The Leap Motion® device is a peripheral device that generates a three-dimensional pattern of dots of infrared (IR) light, which it uses to determine the locations of objects in space. Other examples of touchless input devices include webcams, motion sensors, microphones, and other such touchless input devices.

However, devices like the Microsoft® Kinect® camera and the Leap Motion® device are typically used in gesture recognition. More specifically, when the touchless input devices are configured to capture objects (e.g., hands, fingers, faces, etc.), the position of the objects captured over time may be used to identify one or more gestures, where each gesture is associated with an action. For instance, a first gesture, e.g., the shake of a hand to say goodbye, may be interpreted as closing a current process in execution. The touchless interaction through gestures is widespread to the point where different software development kits (SDK) for input devices provide a number of gestures natively.

However, there are several technical problems to gesture-based interaction. First, the recognition process is not scalable. In other words, as the number of acceptable gestures (e.g., recognized gestures) increase, the process of discerning between gestures becomes more error prone (one gesture may be interpreted as another gesture). In addition, a regular GUI cannot be used as a visual feedback for acceptable gesture commands, because the user is required to know the gesture beforehand or the regular GUI has to be specifically programmed to recognize a given gesture.

In one embodiment, this disclosure provides for a method that may include capturing, with an input device, a plurality of electronic images corresponding to a plurality of physical objects detected within a physical three-dimensional region and establishing, with one or more processors, a virtual three-dimensional region mapped to the physical three-dimensional region, with the virtual three-dimensional region defining a space where a plurality of virtual objects are instantiated based on the plurality of electronic images. The method may also include selecting, with the one or more processors, a virtual object from the plurality of virtual objects as one or more commanding objects, with the one or more commanding objects indicating a command of a GUI to be performed based on a position of the one or more commanding objects, and performing the command of the GUI based on the position of the one or more commanding objects.

In another embodiment, this disclosure provides a system that may include an input device configured to capture a plurality of electronic images corresponding to a plurality of physical objects detectable within a physical three-dimensional region; a non-transitory, computer-readable medium storing computer-executable instruction; and one or more processors in communication with the input device and the non-transitory, computer-readable medium that, having executed the computer-executable instructions, are configured to establish a virtual three-dimensional region mapped to the physical three-dimensional region, with the virtual three-dimensional region defining a space where a plurality of virtual objects are instantiated based on the plurality of electronic images. The one or more processors may also be configured to select a virtual object from the plurality of virtual objects as one or more commanding objects, with the one or more commanding objects indicating a command of a GUI to be performed based on a position of the one or more commanding objects, and perform the command of the GUI based on the position of the one or more commanding objects.

This disclosure further provides for a non-transitory, computer-readable medium. In one embodiment, the non-transitory, computer-readable medium may include computer-executable instructions stored thereon that, when executed by one or more processors, cause the one or more processors to perform a method. The method may include receiving a plurality of electronic images captured by an input device, with the plurality of electronic images corresponding to a plurality of physical objects detected within a physical three-dimensional region; establishing a virtual three-dimensional region mapped to the physical three-dimensional region, with the virtual three-dimensional region defining a space where a plurality of virtual objects are instantiated based on the plurality of electronic images; selecting a virtual object from the plurality of virtual objects as one or more commanding objects, with the one or more commanding objects indicating a command of a GUI to be performed based on a position of the one or more commanding objects; and performing the command of the GUI based on the position of the one or more commanding objects.

In an example embodiment, a computer system provides a visual feedback for the user to aid the user in identifying where a recognized object is located relative to a GUI. The visual feedback may be presented in a manner familiar to the user, such as by displaying a graphic in two-dimensional space representative of the three-dimensional object, which makes the touchless interaction a natural extension to familiar tactile interactions. In an example embodiment, the systems and methods may not rely on gestures, which may allow an increasing the range of possible input commands and facilitate the reuse of any already-established GUIs.

FIG. 1 is a block diagram of a system 100 for creating a touchless interaction environment, in accordance with an example embodiment. The system 100 may include a touchless input device 104, a computer system 106 communicatively coupled to the touchless input device 104, and a display 108 communicatively coupled to the computer system 106. A user 102 may use the touchless input device 104 to interact with the computer system 106.

The touchless input device 104 may be any one or combination of touchless input devices. As examples, the touchless input device 104 may be a webcam, microphone, motion capture device, or other such touchless input device. In one embodiment, the touchless input device 104 may be a Leap Motion® device. In another embodiment, the touchless input device 104 may be a Microsoft® Kinect® camera. The touchless input device 104 may be configured to detect one or more objects in a physical, three-dimensional region and provide data to the computer system 106 relating to the detected objects. As examples, the data may include positional data (e.g., one or more three-dimensional coordinates where an object was detected), image data (e.g., one or more electronic images representing one or more pictures of the detected objects), motion data (e.g., velocity, acceleration, orientation, and so forth of one or more detected objects), or combinations of such data.

The computer system 106 may be configured to translate the data obtained by the touchless input device 104. In particular, the computer system 106 may translate the data from the touchless input device 104 into positional data relative to an image displayed by the display 108. For example, the display 108 may display an image having a known height and width (e.g., a GUI having a known resolution), and the computer system 106 may be configured to translate the three-dimensional position of an object detected by the touchless input device 104 into a two-dimensional position within the image displayed by the display 108. The computer system 106 may further instantiate a virtual object to represent the physical object, and may display the virtual object with the translated two-dimensional position. As the translation of the three-dimensional position to the two-dimensional position may result in a loss of a positional component of the data relating to the three-dimensional position of the physical object (e.g., a distance of the physical object from a known origin point), the computer system 106 may modify a characteristic of the virtual object, such as its size, color, height, width, radius, or other such characteristic to denote this missing dimensional component. For example, and in one embodiment, objects having a larger distance component (e.g., are further away from a known origin point) in the physical, three-dimensional region may appear as smaller virtual objects on the display 108, whereas objects having a smaller distance component (e.g., are closer to a known origin point) may appear as larger virtual objects on the display 108. In this embodiment, and as discussed below with reference to FIG. 6 and FIG. 7, the size of the virtual object may indicate whether a virtual object is intended to provide a command understood by a GUI.

Although shown as a single box in FIG. 1, the computer system 106 may be an individual system or a cluster of systems, and may be configured to perform activities related to receiving positional data and translating such positional data, such as storing positional data, processing the positional data according to scripts and software applications, controlling one or more applications via an operating system, receiving commands for the operating system via a GUI, and other such activities. The system 106 may include one or more non-transitory, computer-readable storage devices 112, such as a hard drive, optical drive, magnetic tape drive, or other such non-transitory, computer-readable media, and may further include one or more processors 110.

The one or more processors 110 may be any type of commercially available processors, such as processors available from the Intel Corporation, Advanced Micro Devices, Texas Instruments, or other such processors. Furthermore, the one or more processors 110 may be of any combination of processors, such as processors arranged to perform distributed computing via the computer system 106.

Figure 2:
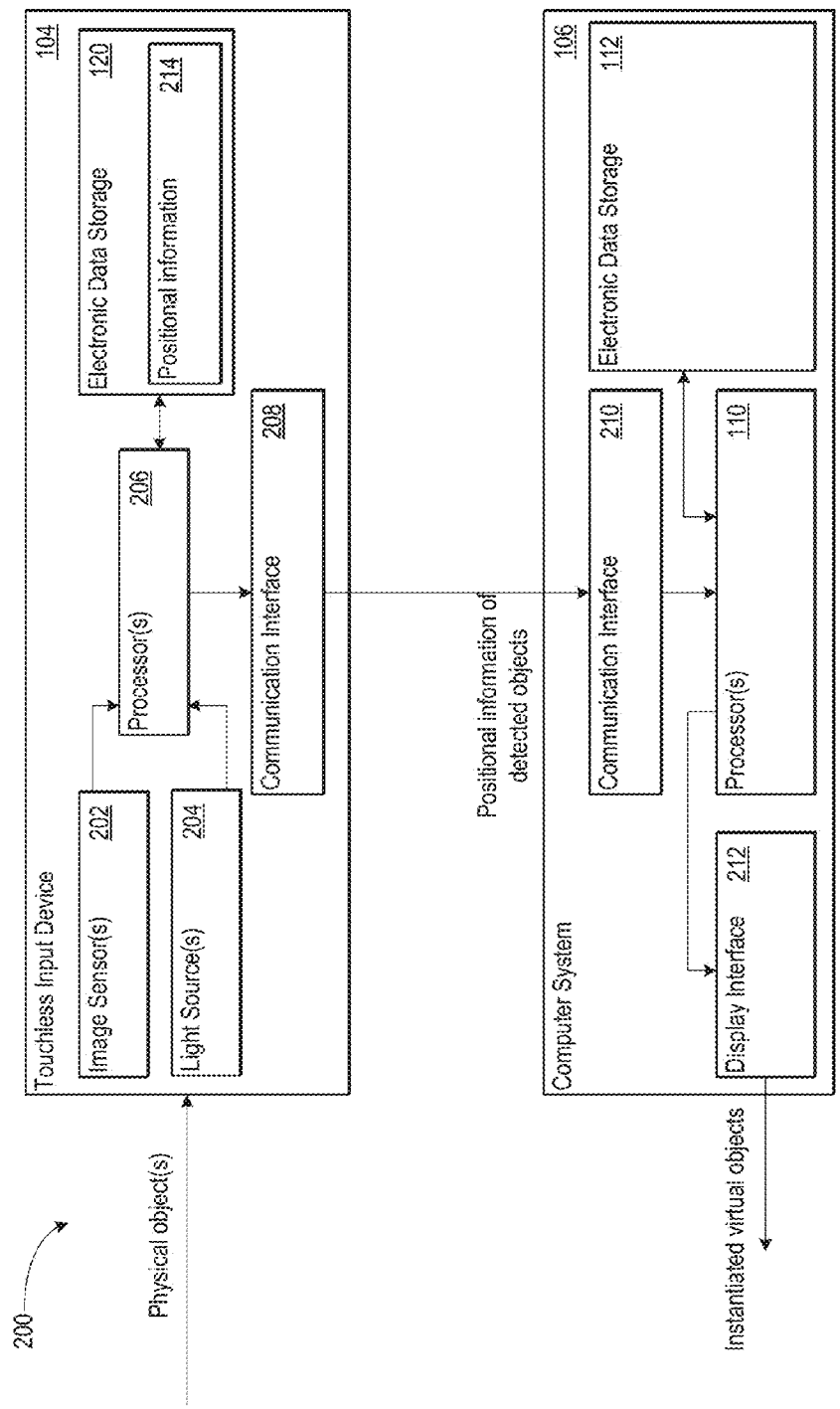
FIG. 2 is a block diagram illustrating a touchless input device, in accordance with an example embodiment, interacting with a computer system.

FIG. 2 is a block diagram illustrating a touchless input device 104, in accordance with an example embodiment, interacting with a computer system 106. The touchless input device 104 may be communicatively coupled to the computer system 106 and communicate via one or more communication interfaces. The computer system 106 may communicate with the display 108 via one or more display interfaces 212. In one embodiment, the touchless input device 104 may include one or more image sensor(s) 202, one or more light source(s) 204, one or more processors 206, an electronic data storage device 120, and a communication interface 208.

The one or more image sensor(s) 202 may be configured to detect one or more objects within a three-dimensional region. In one embodiment, the one or more image sensor(s) 202 may be monochromatic infrared cameras. In another, the one or more image sensor(s) 202 may be a depth sensor implemented as an infrared laser projector combined with an active-pixel sensor, such as a CMOS sensor. In yet a further embodiment, the one or more image sensor(s) 202 may be an RGB camera. Combinations and variations of the foregoing sensors are also possible. The one or more image sensor(s) 202 may provide positional information 214 that includes, but is not limited to, two-dimensional coordinates of one or more detected objects, three-dimensional coordinates of one or more detected objects, infrared images of detected objects, colorized images of detected objects, and other such information. Furthermore, the touchless input device 104 may be configured to interpret the obtained positional information 214 from the image sensor(s) 202 so as to determine relative locations of objects in the received positional data. Alternatively or additionally, the touchless input device 104 may send the received positional information 214 to the computer system 106, which may then determine the locations of objects detected by the one or more image sensor(s) 202.

The touchless input device 104 may also include one or more light source(s) 204 for illuminating a three-dimensional region in which one or more objects may be detected. In one embodiment, the one or more light source(s) 204 include infrared light emitting diodes (LEDs). In this embodiment, each infrared LED may emit a single beam of light, which may be reflected by an object in the three-dimensional region. The reflection of the beam of light may then be detected by one or more of the image sensor(s) 202. Alternatively or additionally, the one or more light source(s) 204 may include full spectrum (e.g., white light) LEDs, ultraviolet LEDs, incandescent or compact fluorescent lights, or any other type of light source. In this manner, the light source(s) 204 illuminate a three-dimensional region where an object may be detected.

Figure 5:
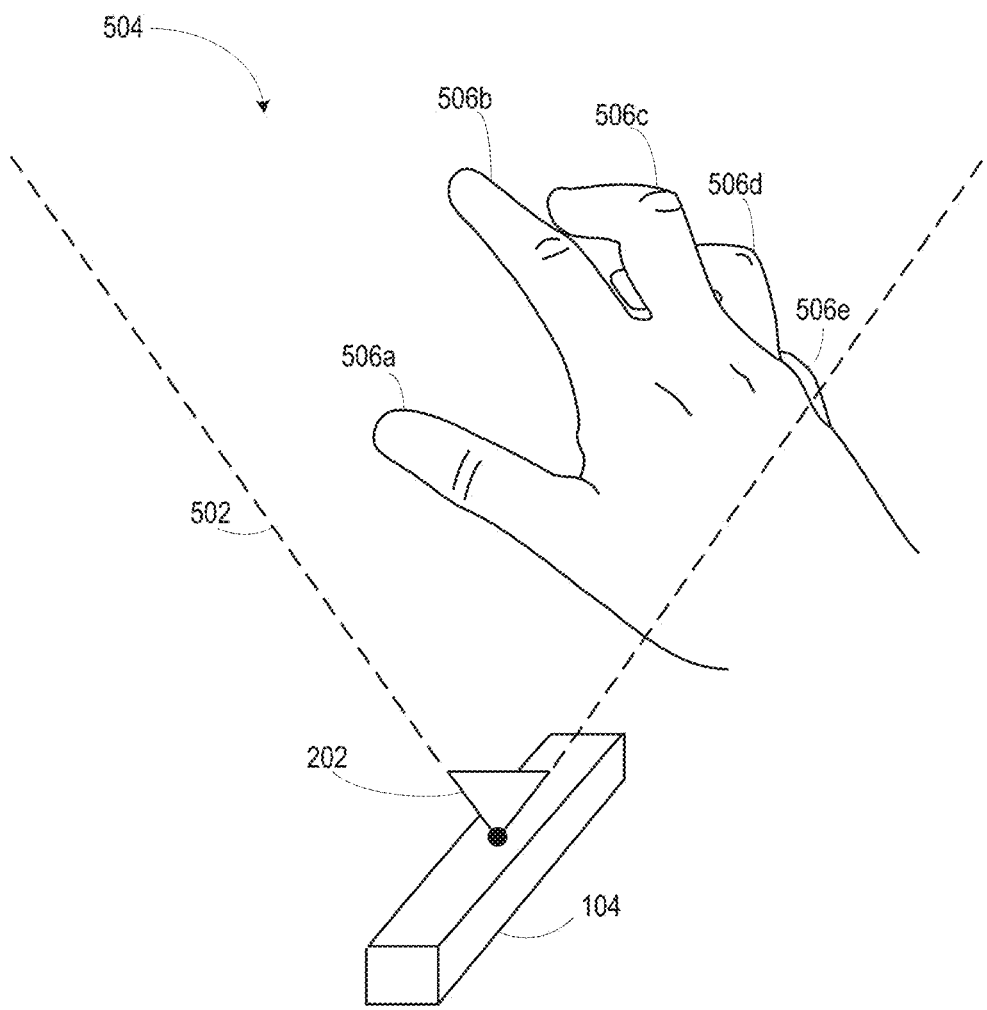
FIG. 5 illustrates an example three-dimensional region where the touchless input device of FIG. 1 may detect one or more objects.

Referring to FIG. 5, there is shown an example three-dimensional region 504 where the touchless input device 104 of FIG. 1 may detect one or more objects 506a-506e. In one embodiment, the touchless input device 104 may be configured to establish the three-dimensional region 504 using one or more of the imaging sensor(s) 202 and light source(s) 204, where objects 506a-506e inside the three-dimensional region 504 are captured by the imaging sensor(s) 202 and objects outside the three-dimensional region 202 are not. Alternatively or additionally, one or more of the imaging sensor(s) 202 may capture a single object (e.g., a user's hand) and then the touchless input device 104 and/or computer system 106 may computationally segment the user's hand into the objects 506a-506e.

The three-dimensional region 504 may be established as a viewing frustum 502 for one or more of the imaging sensor(s) 202. In one embodiment, the shape of the viewing frustum 502 may be a rectangular pyramid, where a top portion of the viewing frustum 502 is sliced by a plane extending through the viewing frustum 502 and parallel to a base plane of the viewing frustum 502. The base of this rectangular pyramid may be the maximum distance from the imaging sensor(s) 202 to detect one or more objects, and the top may be the minimum distance. The viewing frustum 502 may delimit where the user may interact with the computer system 106 using his or her hands, fingers, pointing devices, and other such objects. The mathematical formula that defines the viewing frustum 502 of the touchless input device 104 may depend on a distance to an origin point and, as one example, a point in the center of a region of interaction. As discussed below with reference to FIG. 6, the viewing frustum 502 combined with a virtual frustum (e.g., virtual frustum 604) may create a virtual environment for visual feedback.

Referring back to FIG. 2, the touchless input device 104 may also include a communication interface 208 for sending positional information 214 to the computer system 106. The communication interface 208 may include any combination of wired and/or wireless interfaces. For example, the communication interface 208 may include a Universal Serial Bus (USB) interface. Alternatively, or additionally, the communication interface 208 may include an Ethernet interface. In yet another embodiment, the communication interface 208 may include a wireless interface for communicating wirelessly with the computer system 106 using one or more wireless communication protocols, such as 802.11b/g/n, Bluetooth®, infrared (e.g., the Infrared Data Association set of protocols), or any other wireless communication protocol.

To receive the positional information 214 from the touchless input device 104, the computer system 106 may also include a communication interface 210. The communication interface 210 may include any combination of wired and/or wireless interfaces. For example, the communication interface 210 may include USB. Alternatively, or additionally, the communication interface 210 may include an Ethernet interface. In yet another embodiment, the communication interface 210 may include a wireless interface for communicating wirelessly with the touchless input device 104 using one or more wireless communication protocols, such as 802.11b/g/n, Bluetooth®, infrared (e.g., the Infrared Data Association set of protocols), or any other wireless communication protocol.

The computer system 106 may store the positional information 214 received from the touchless input device 104 in one or more electronic data storages 112 via one or more processors 110. The computer system 106 may then transform the received positional information 214 into two-dimensional position coordinates that correspond to image pixels of an image displayed by the display 108. Furthermore, the computer system 106 may instantiate one or more virtual objects corresponding to the objects detected by the touchless input device 104. The virtual objects may then be displayed in the image displayed by the display 108 at the two-dimensional position coordinates determined by the computer system 106. Although two-dimensional position coordinates are discussed above, the computer system 106 may determine any type of positional coordinates (e.g., three-dimensional position coordinates) based on the positional information 214 received from the touchless input device 104. As discussed below, the computer system 106 may be configured with one or more transformation matrices to transform the positional information 214 from one coordinate system (e.g., the coordinate system used by the touchless input device 104) to any other type of coordinate system (e.g., the coordinate system of the image displayed by the display 108).

To display the virtual objects on the display 108, the computer system 106 may be configured with a display interface 212 for communicating with the display 108. The display interface 212 may include one or more wired and/or wireless display interfaces. For example, the display interface 212 may include a High-Definition Multimedia Interface (HDMI), a Digital Visual Interface (DVI) interface, a DisplayPort interface, Intel® WiDi, and other such display interfaces.

Figure 3:
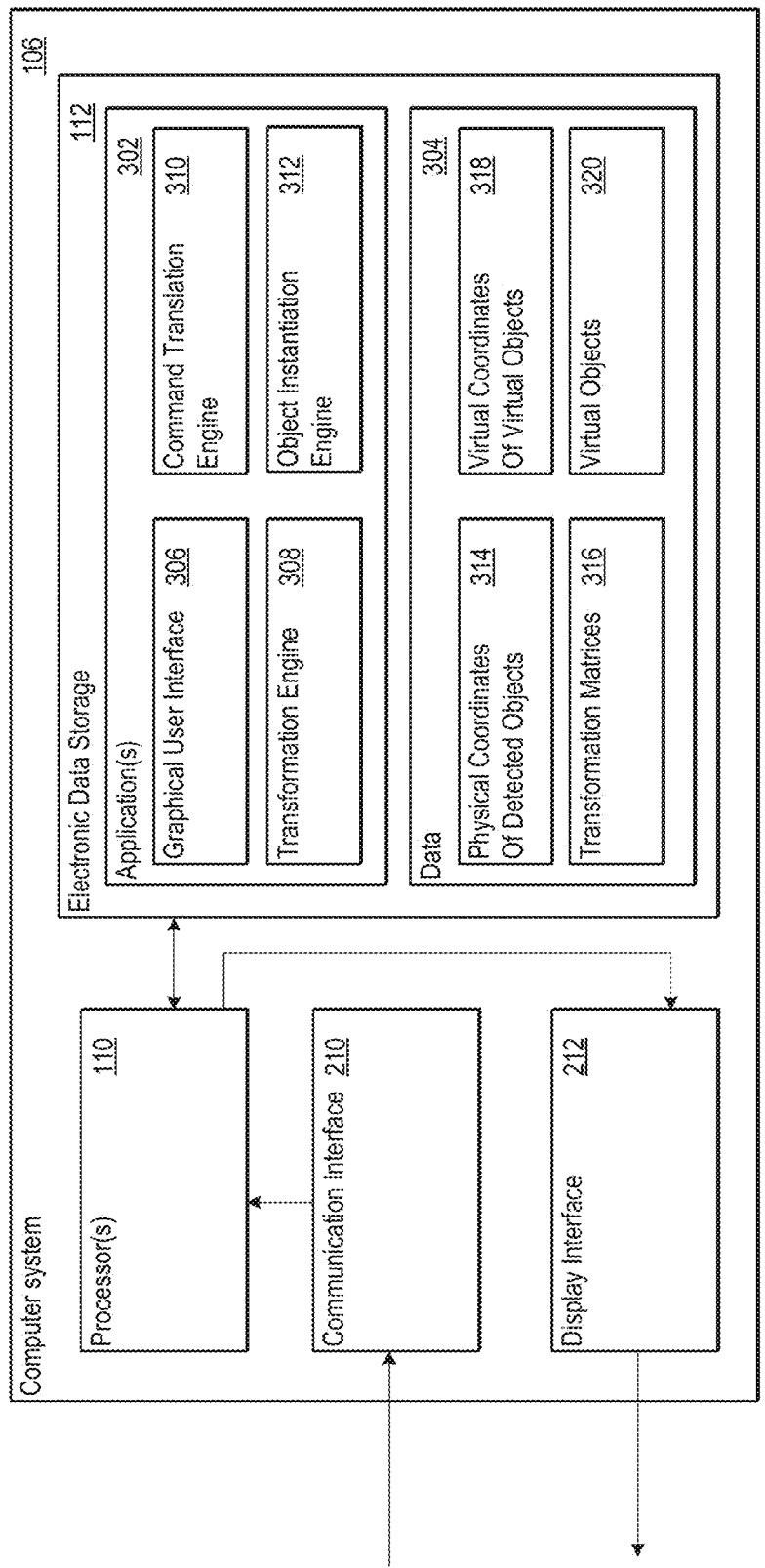
FIG. 3 illustrates a computer system, in accordance with an example embodiment.

FIG. 3 illustrates a computer system 106, in accordance with an example embodiment. In one embodiment, the electronic data storage 112 may be configured with one or more applications 302 and various types of data 304. The one or more applications 302 may include a GUI 306, a transformation engine 308, a command translation engine 310, and an object instantiation engine 312. The various types of data may include physical coordinates of detected objects 314, one or more transformation matrices 316, virtual coordinates of virtual objects 318, and one or more instantiated virtual objects 320 based on the detected objects. The computer system 106 may invoke one or more of the applications 302 to transform the positional information of detected objects based on the data 304 into virtual objects and virtual positions, and to display such virtual objects on the display 108 via the display interface 212.

The GUI 306 may be configured to accept commands for controlling the computer system 106. As discussed previously, a GUI 306 may accept commands via a tactile input device (e.g., a mouse, a keyboard, etc.), and modifications to the GUI 306 may be required to accept input via a touchless input device. Modifications may include translating gestures into commands understandable by the GUI 306. However, as also previously discussed, such gestures may be difficult or time consuming to learn, and it would be advantageous for a user to be able to interact with the GUI 306 without having to learn such gestures. Thus, in one embodiment, the GUI 306 is unmodified in the sense that a user is not required to learn gestures to provide commands to the computer system 106.

Figure 4:
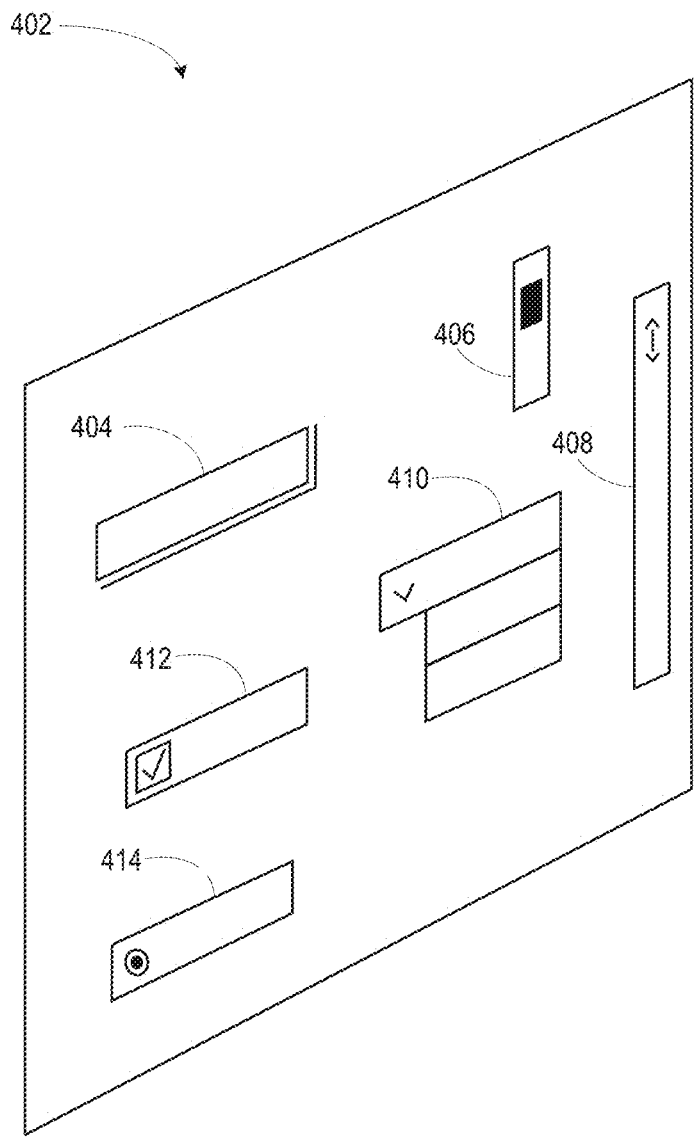
FIG. 4 illustrates a GUI, in accordance with an example embodiment.

FIG. 4 illustrates a GUI 402, in accordance with an example embodiment. The GUI 402 may include various graphical controls 404-414 for providing commands to the computer system 106. As examples, and without limitation, these controls may include one or more graphical controls 404, one or more selectable check boxes 412, one or more selectable option boxes 414, one or more selectable drop-down menus 410, one or more selectable and controllable scroll bars 406, and various selectable and controllable horizontal and/or vertical sliders 408. Each of the graphical controls 404-414 may provide a different command to the GUI 402 and may be displayed individually, concurrently, or in combinations thereof.

Figure 6:
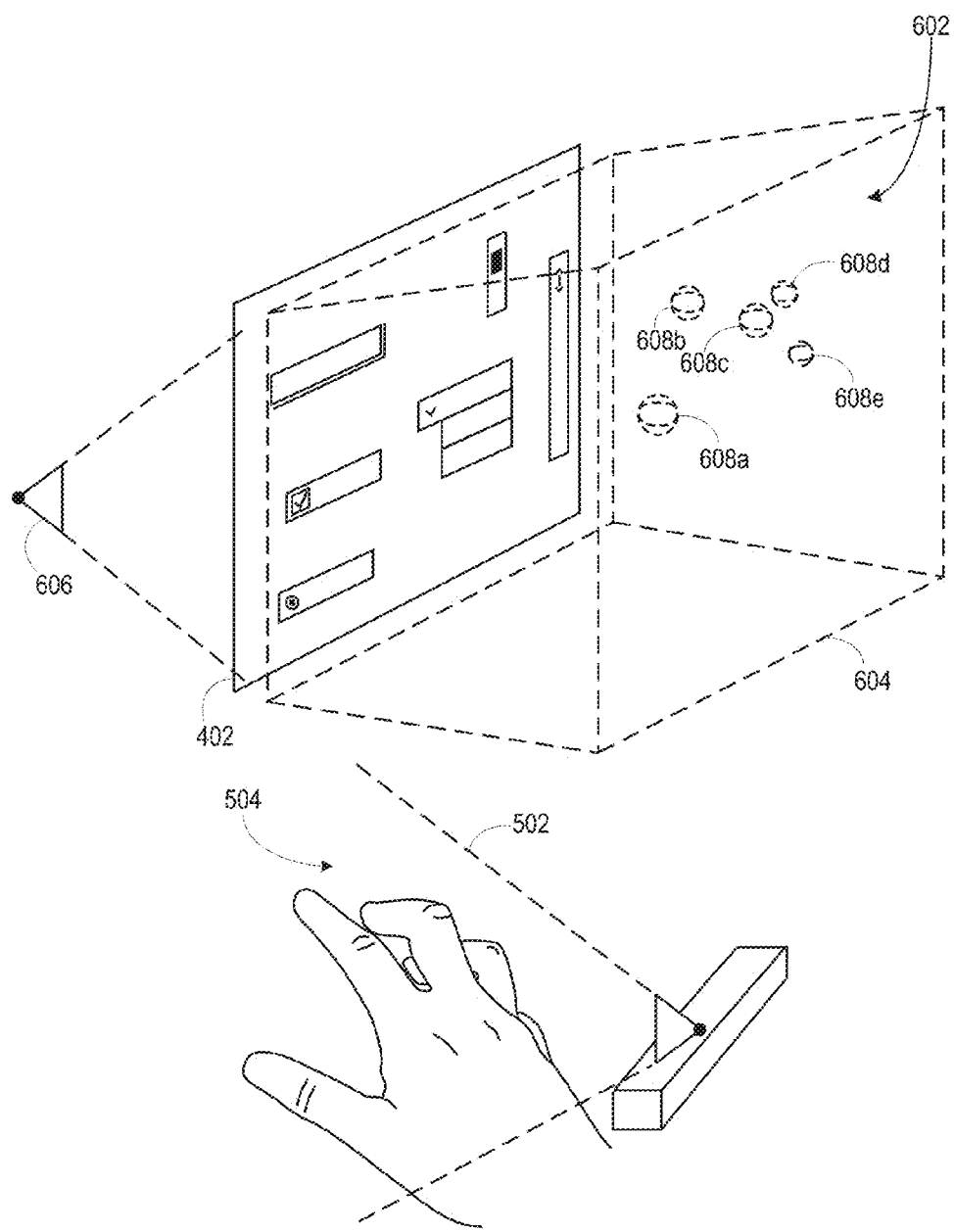
FIG. 6 illustrates an example instantiation of virtual objects based on the user interacting with the touchless input device of FIG. 2.

To accept commands from the touchless input device 104 that control the GUI 402, the computer system 106 may establish a virtual environment in which virtual objects are instantiated based on physical objects (e.g., objects 506a-506e) detected by the touchless input device 104. FIG. 6 illustrates an example instantiation of virtual objects 608a-608e based on the user interacting with the touchless input device 104. In one embodiment, the computer system 106 may replicate the three-dimensional region 504 of the touchless input device 104 as a virtual three-dimensional region 602.

In one embodiment, objects appearing in the physical, three-dimensional region 504 are instantiated as virtual objects 608a-608e inside the virtual, three-dimensional region 602. The virtual objects 608a-608e may be instantiated with any shape, such as rectangles, spheres, triangles, or other such shapes. Furthermore, each object detected by the touchless input device 104 may be instantiated as a unique virtual object, such that each virtual object has different characteristics (e.g., shape, color, size, orientation, etc.). Alternatively, or in addition, the virtual objects 608a-608e may each represent a portion of a larger object detected within the physical three-dimensional region 504. For example, where a user's hand and/or finger is detected within the physical, three-dimensional region 504, a virtual object may be instantiated representing a portion of the user's hand or finger, such as the tip of the finger. In this embodiment, the fingertip may be represented as a sphere displayed on the display 108.

The computer system 106 may instantiate the virtual objects 608a-608e by establishing a virtual camera 606 that creates a second viewing frustum 604 which mirrors (or is substantially similar to) the viewing frustum 502 of the one or more image sensor(s) 202 of the touchless input device 104. In one embodiment, the computer system 106 may emulate the virtual camera 606, which may be responsible for several tasks: 1) to define the boundaries of the virtual world where the virtual objects exist; and 2) to define a perspective projection to be performed on the virtual objects 608a-608e onto a projection plane. The projection plane may be established at several locations on the second viewing frustum 604, such as the bottom or the top of the frustum pyramid. Alternatively, or in addition, the projection plane may be defined to align with the displayed GUI 402. In other words, the projection plane may have the same, or substantially the same, height and width as the image of the GUI 402.

The computer system 106 may establish the virtual camera 606 at one or more locations along the second viewing frustum 604, such as in front of or behind the projection plane. As shown in FIG. 6, the computer system 106 has established the virtual camera 606 behind the projection plane. Moreover, the virtual camera 606 and the image sensor(s) 202 of the touchless input device 104 may be located at different positions and, further still, may have different orientations. As the virtual camera 606 and the image sensors(s) 202 may have different positions, orientations, and viewing frustum dimensions, the computer system 106 may employ one or more transformation matrices 316 that map the first viewing frustum 502 to the second viewing frustum 604 and one or more transformation matrices 316 that map the second viewing frustum 604 to the first viewing frustum 502. The technical effect of mapping the viewing frustums 502, 604 is that the computer system 106 can translate three-dimensional coordinates of detected objects in the physical, three-dimensional region 504 to virtual, three-dimensional coordinates for virtual objects instantiated in the virtual, three-dimensional region 602. To accomplish this mapping, the computer system 106 may be configured with one or more transformation engines 308 to apply the one or more transformation matrices 316 to the positional information of the detected objects. In addition, the second viewing frustum 604 may be calibrated at will for a better user experience.

Below is an example of converting physical coordinates of detected objects to virtual coordinates of virtual objects. In this example, the touchless input device 104 may be the Leap Motion® device and the display 108 may be the screen of a laptop or other computing device having known dimensions (e.g., height and width). The viewing frustum (e.g., the viewing frustum 502) created by the Leap Motion® device may have a coordinate system with an origin established seven centimeters (7 cm.) away from it, a y-axis pointing away from the Leap Motion® device, and an x-axis and a z-axis spanning the device plane. It should be understood that the foregoing arrangement of axes and origin point may be specific to the Leap Motion® device and that other touchless input devices, such as the Microsoft® Kinect® camera, may establish a different arrangement of origin point and axes. However, such variations and arrangements are contemplated as falling within the breadth of this disclosure.

The display 108 may also have a virtual viewing frustum (e.g., viewing frustum 604). The virtual viewing frustum defined for the display 108 may have a coordinate system with an origin point located approximately at the same distance as the origin point for the coordinate system of the touchless input device 104. However, other orientations or arrangements of axes may differ. For example, the z-axis of the coordinate system for the virtual viewing frustum may point away from the display 108, with the x-axis and y-axes spanning the height and width, respectively, of the display 108.

The computer system 106 may be configured with a first transformation matrix, $M_{2 \leftarrow 1}$, that is used by one or more transformation engines 308, to convert positions from a coordinate system of a first frustum (e.g., frustum 1) to a coordinate system of a second frustum (e.g., frustum 2). In one embodiment, the transformation matrix $M_{2 \leftarrow 1}$ may be defined as:

$$M_{2 \leftarrow 1} = \begin{pmatrix} 1 & 0 & 0 & 0 \\ 0 & 0 & -1 & 0 \\ 0 & -1 & 0 & 0 \\ 0 & 0 & 0 & 1 \end{pmatrix}$$

In one embodiment, the touchless input device 104 may provide electronic images of the three-dimensional region 504 as positional information, and the computer system 106 may leverage one or more image recognition algorithms to determine the location of one or more objects within the provided electronic images. Alternatively, or additionally, the touchless input device 104 may capture the electronic images of the three-dimensional region 504, and provide physical coordinates of detected objects within the electronic images to the computer system 106.

The computer system 106 may further process the physical coordinates of the detected objects. In particular, the computer system 106 may normalize the physical coordinates. In one example, the physical coordinates are provided in a predetermined scale (e.g., millimeters, centimeters, etc.) and the computer system 106 normalizes these measurements to another scale (e.g., 0-1, 0-10, etc.), where the minimum value of the scale (e.g., 0) is at one side of the region of interaction and the maximum value of the scale (e.g., 1) is at the opposite side of the region of interaction. The computer system 106 may then transform the normalized coordinates by applying the transformation matrix $M_{2 \leftarrow 1}$. The result of this application may be one or more coordinates within the virtual three-dimensional region 602 where one or more virtual objects are to be instantiated.

Having obtained the virtual coordinates for the virtual, three-dimensional region 602, the computer system 106 may further transform the virtual coordinates into coordinates mapped to the dimensions of the display 108. In particular, the computer system 106 may be configured with a second transformation matrix, $M_{w \times h}$, which one or more transformation engines 308 may apply to convert the virtual coordinates to the display coordinates, where the display 108 has a first set of pixels in width (w) and a second set of pixels in height (h). In one embodiment, the transformation matrix $M_{w \times h}$ may be defined as:

$$M_{w \times h} = \begin{pmatrix} \frac{w}{2} & 0 & 0 & \frac{w}{2} \\ 0 & \frac{-h}{2} & 0 & \frac{-h}{2} \\ 0 & 0 & 1 & 0 \\ 0 & 0 & 0 & 1 \end{pmatrix}$$

These sequences of transformations allow the computer system 106 to display physical objects detected in the three-dimensional region 504 as virtual objects instantiated a two-dimensional plane (namely, the plane of the image where the GUI 402 is displayed). Other types or combinations of projections may also be implemented.

After obtaining coordinates where the virtual objects are to be instantiated, the computer system 106 may then display the instantiated virtual objects with characteristics relative to their locations in the physical world. In one embodiment, the computer system 106 may display the virtual objects as images appearing in a projection image overlaid on the image of the GUI 402. Where no object is detected, the projection image may be transparent; otherwise, the projection image may contain the shape and the color of the virtual object. This projection image may be combined with the image of the GUI 402 to generate the visual feedback of the user interacting with the GUI 402.

Figure 7:
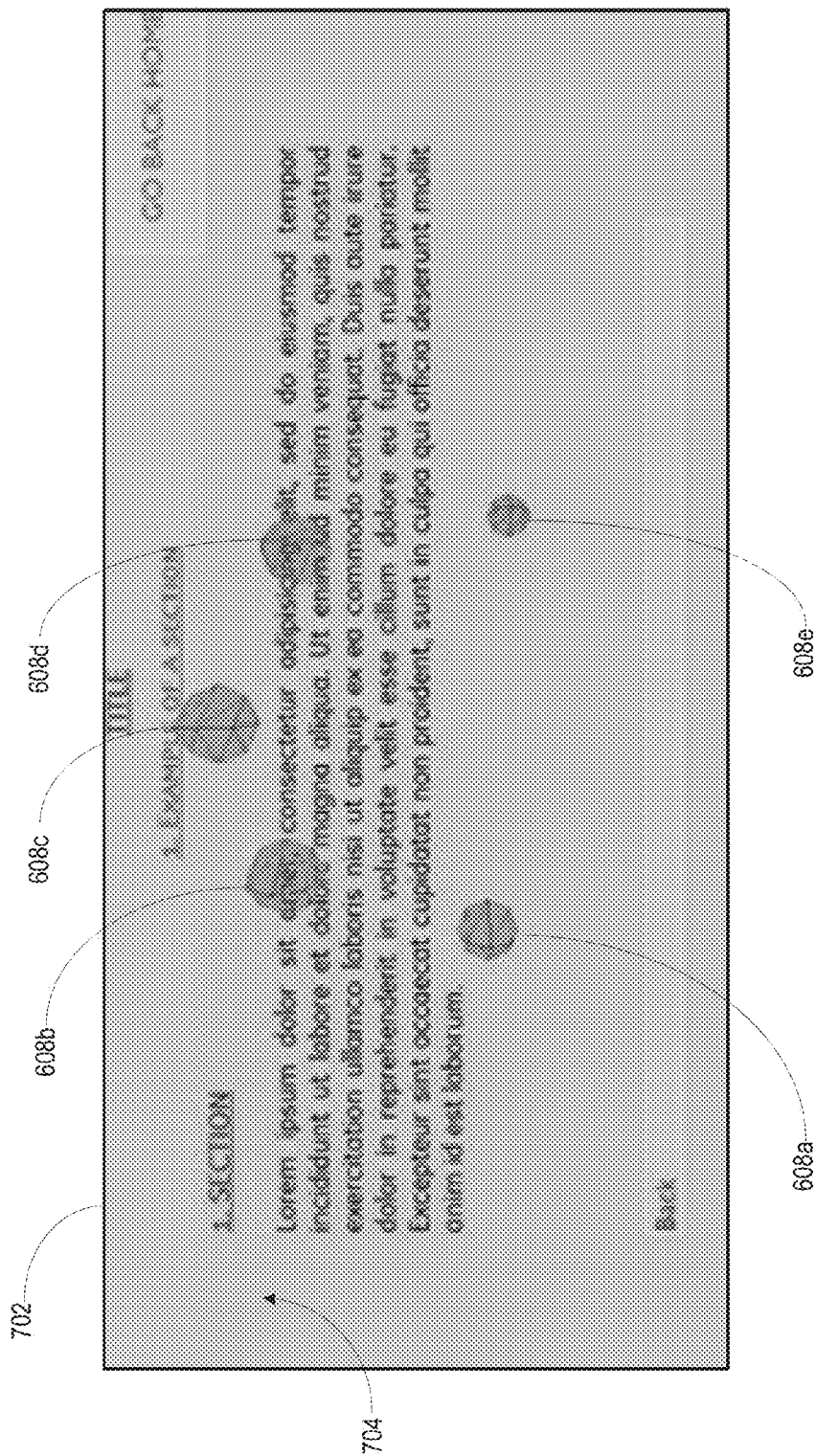
FIG. 7 illustrates an example composite image where a projection image having the instantiated virtual objects of FIG. 6 is combined with an image of a GUI.

FIG. 7 illustrates an example composite image 702 where a projection image 704 having the instantiated virtual objects 608a-608e of FIG. 6 is combined with an image of the GUI 402. Virtual objects 608a-608e may be instantiated as spheres, which may then be projected onto the projection image overlaid on the GUI 402. The result of projecting the virtual objects 608a-608e into the projection image 704 is that the virtual objects 608a-608e may appear as circles displayed on a transparent image combined with the GUI 402 (e.g., as the composite image 702).

As discussed previously, a characteristic of the virtual objects 608a-608e may be modified to indicate a distance component which may be lost in the projection of the virtual objects from the three-dimensional realm to the two-dimensional. In particular, a size of the virtual objects 608a-608e may be modified to reflect distance. However, other characteristics may also be modified, such as color, shape, orientation, or other characteristic. Furthermore, the modifiable characteristic may be selectable and/or configurable by the user.

Where the size of the virtual object is used to indicate distance, virtual objects close to the virtual camera may appear larger while virtual objects further from the virtual camera may appear smaller. This effect helps the user to discern which physical objects are being used to provide commands to the GUI (e.g., is a commanding object). For instance, if one finger is over a particular GUI component, such as a button, that component may be highlighted to indicate the possibility of activating it. If the same finger moves closer to the component, it may be activated.

In one embodiment, the computer system 106 may be calibrated and/or configured by the user with varying distances to discern between whether a GUI component is being selected and whether that GUI component is being activated. For example, the computer system 106 may be configured with a command translation engine 310 to determine whether the user has intended a command to be performed given the location of a physical object and whether that physical object has moved closer or farther from the given location. In one embodiment, the command translation engine 310 may be configured with a threshold command distance, which may be a distance from the virtual camera that indicates whether an object is intended to provide a command. Thus, objects in or past the threshold command distance may be considered commanding objects. Furthermore, in some instances, the command translation engine 310 may be configured such that moving a physical object closer to the virtual camera may activate the GUI component. In other instances, the command translation engine 310 may be configured such that moving the physical object further from the virtual camera may activate the GUI component. In either instance, the user may configure the command translation engine 310 and/or the computer system 106 to indicate whether movements closer or farther from the virtual camera are intended to provide a command. Moreover, as the movements are intuitive, the user does not need to learn any new or extra gestures to provide commands to the GUI 402.

Figure 8A:
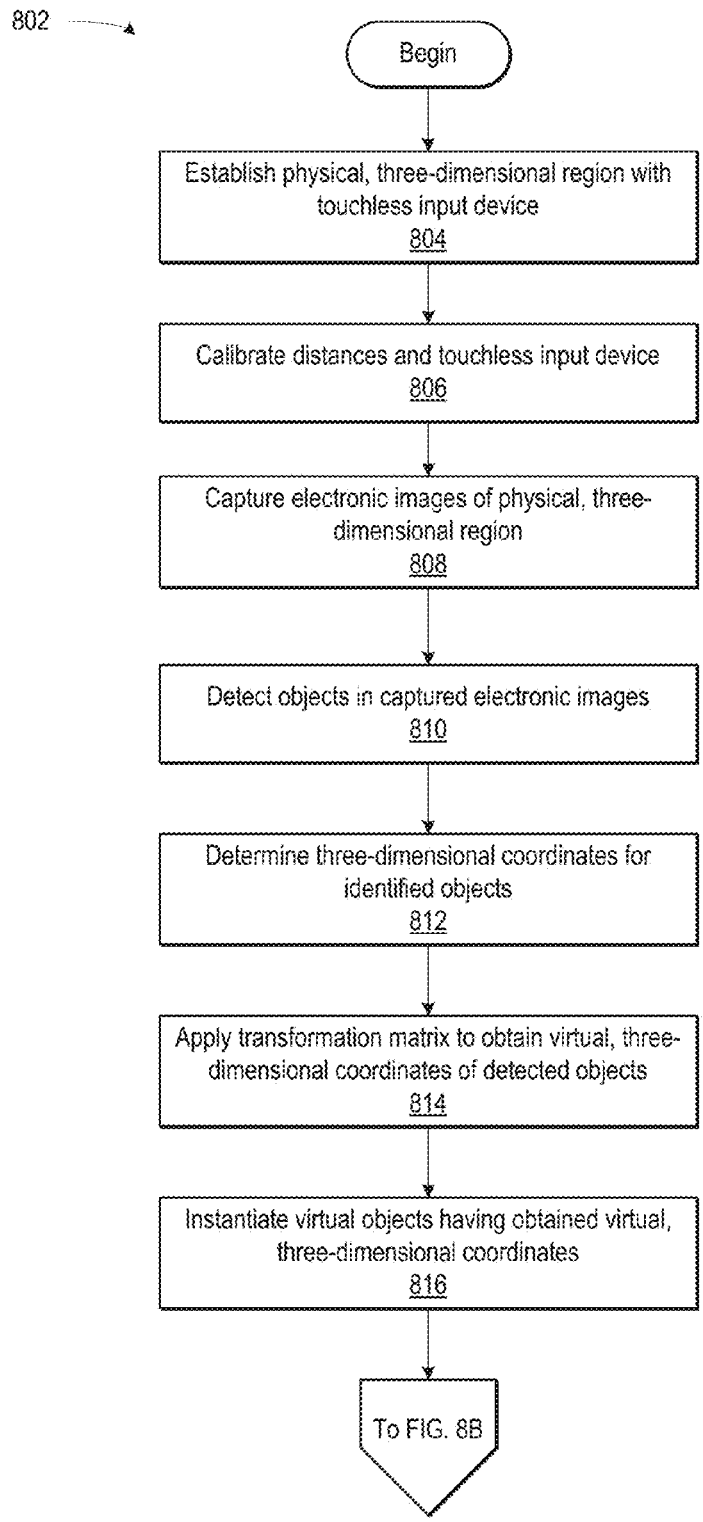
FIGS. 8A-8C illustrate a method, in accordance with an example embodiment, of creating a touchless interaction environment.
Figure 8B:
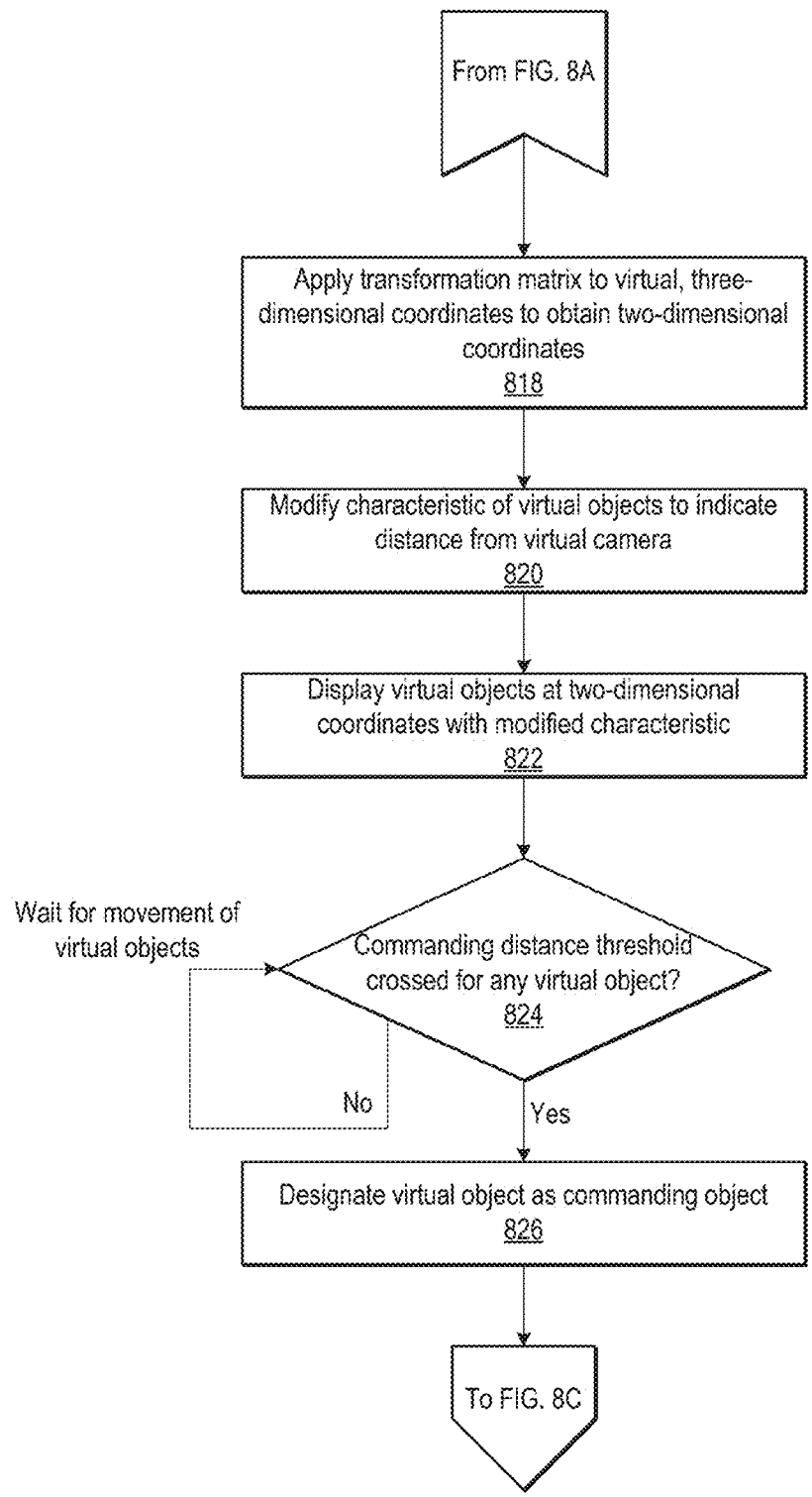
Figure 8C:
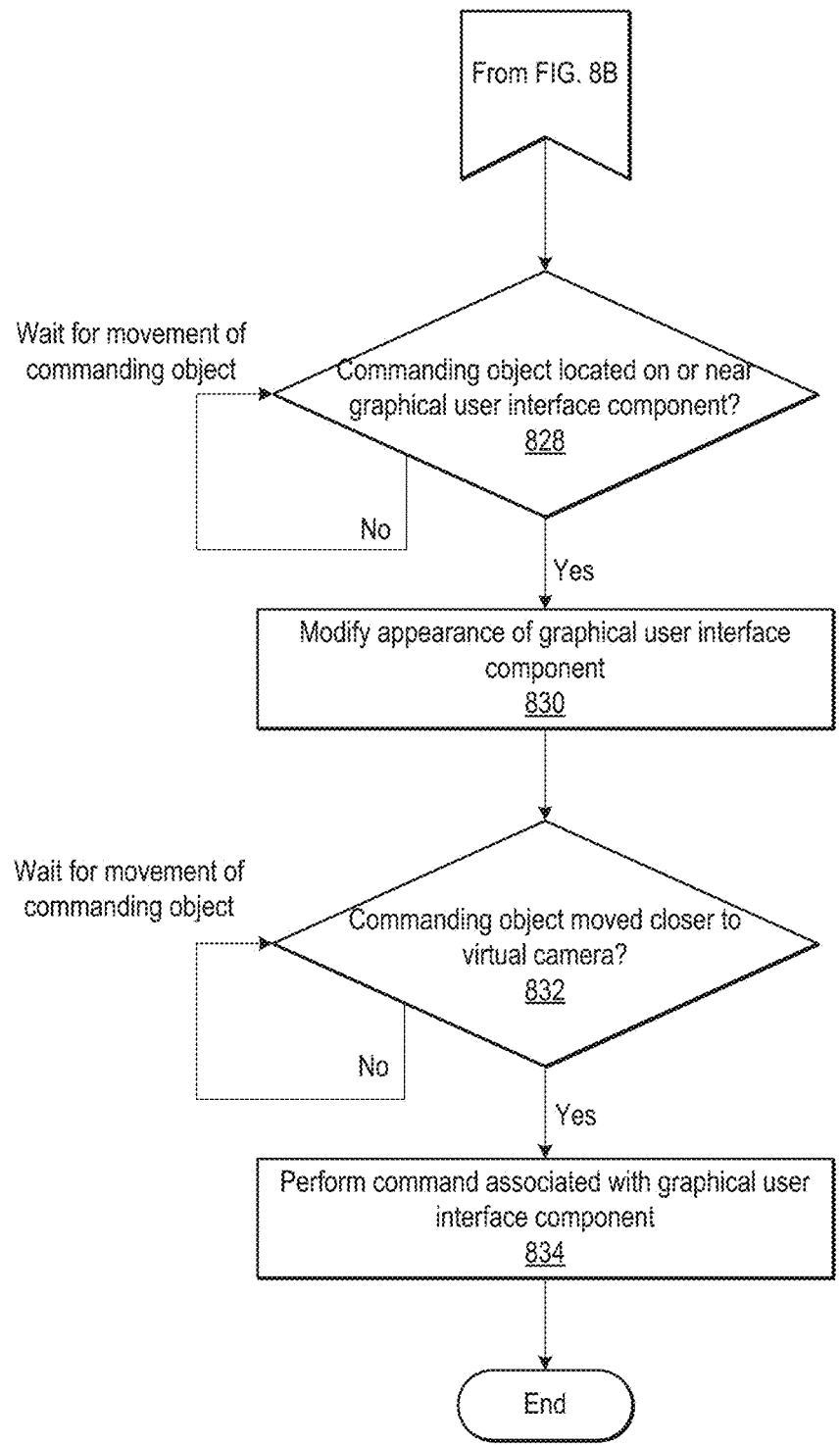

FIGS. 8A-8C illustrate a method 802, in accordance with an example embodiment, of creating a touchless interaction environment. The method 802 may be implemented on the touchless input device 104 and, accordingly, is merely described by way of reference thereto. In an example embodiment, initially, the touchless input device 104 may be configured to establish a three-dimensional region 504 based on a viewing frustum 502 where one or more objects are to be detected (Operation 804). In addition, various distances, orientations, positions, and other such characteristics may be established for determining whether an object detected by the touchless input device 104 is a commanding object and whether that commanding object has provided a command to a GUI (e.g., GUI 402) (Operation 806). Moreover, a virtual, viewing frustum (e.g., frustum 604) may be established based on the viewing frustum 502 of the touchless input device 104 to create a virtual, three-dimensional region where one or more virtual objects are to be instantiated.

The touchless input device 104 may then capture one or more electronic images of the three-dimensional region 504 (Operation 808). The electronic images may be stored by the touchless input device 104 as positional information 214. In one embodiment, the touchless input device 104 may determine whether objects are present in the captured electronic images (Operation 810) and, if so, determine corresponding three-dimensional coordinates for the detected objects (Operation 812). Additionally, or alternatively, the touchless input device 104 may communicate the electronic images to the computer system 106, which may then perform object detection and coordinate determination on the electronic images.

The computer system 106 may store the three-dimensional coordinates of the detected objects 314 as physical coordinates. Thereafter, the computer system 106 may apply a first transformation matrix via one or more transformation engines 308 to obtain virtual, three-dimensional coordinates corresponding to the physical, three-dimensional coordinates of the detected objects (Operation 814). Accordingly, the computer system 106 may then instantiate one or more virtual objects based on the detected objects, where the one or more virtual objects are located at the determined virtual, three-dimensional coordinates (Operation 816). Alternatively, or in addition, the computer system 106 may instantiate one or more virtual GUI objects corresponding to GUI components, such that the GUI object provide additional feedback (e.g., visual feedback, audio feedback, etc.) to the user. For example, the computer system 106 may instantiate virtual GUI objects as rectangular boxes around the standard GUI components, such that interactions with the virtual GUI objects cause a corresponding change in these objects (e.g., the virtual GUI objects change color).

The computer system 106 may then proceed to displaying the virtual objects. In particular, the computer system 106 may apply another transformation matrix to the virtual, three-dimensional coordinates to obtain two-dimensional coordinates corresponding to the dimensions of a display (Operation 818). As one or more positional components may be lost in the transformation (e.g., a distance component), the computer system 106 may modify one or more characteristics of the virtual objects to indicate relative differences in the missing one or more positional components (Operation 820). For example, the computer system 106 may modify the size of the virtual objects to indicate the distance of each of the virtual objects from a virtual camera.

The computer system 106 may then display the modified virtual objects by overlaying or superimposing a projection image atop an image of the GUI, where the projection image includes images of the modified virtual objects (Operation 822). The projection image and the image of the GUI may be displayed as a composite image on the display.

Thereafter, the computer system 106 may then determine whether any one of the virtual objects is a commanding object (Operation 824). In one embodiment, the computer system 106 may perform this determination by comparing the distance of a virtual object to the virtual camera with a commanding object distance threshold. Where more than one virtual object has crossed the commanding object distance threshold, the virtual object with the least (e.g., closest) or greatest (e.g., furthest) distance may be selected as the commanding virtual object (Operation 826).

The computer system 106 may then compare the two-dimensional location of the commanding virtual object with the location of one or more GUI components (Operation 828). Where the commanding virtual object is at the same (or about the same) location as a GUI component, the computer system 106 may modify the appearance of the graphical user interface, such as by changing its color, hue, brightness, font, or other such characteristic (Operation 830). Should the computer system 106 then determine that the commanding virtual object has moved closer to (or farther away from) the GUI component (Operation 832), the computer system 106 may determine that the user has intended that the computer system 106 perform the command associated with the GUI component (Operation 834).

Figure 9:
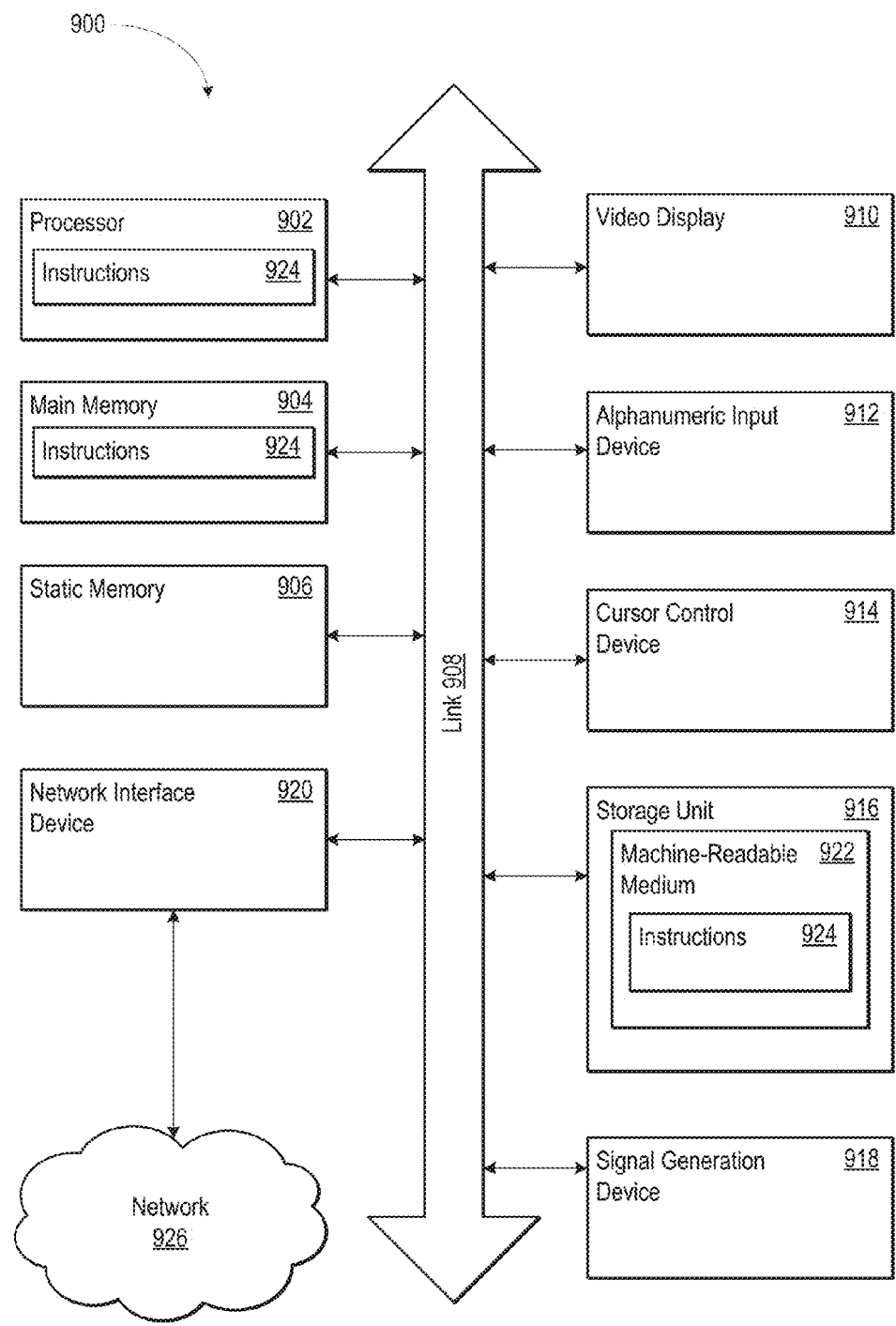
FIG. 9 is a block diagram illustrating components of a machine, in accordance with an example embodiment, configured to read instructions from a machine-readable medium and perform any one or more of the disclosed methodologies.

FIG. 9 is a block diagram illustrating components of a machine 900, in accordance with an example embodiment, configured to read instructions from a machine-readable medium and perform any one or more of the disclosed methodologies. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative examples, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a video display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium of the disclosed systems and methods may be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Although the foregoing discussion has assumed that the same virtual object is the commanding object throughout the various operations, it is contemplated that the commanding object may change at any point depending on the locations of the objects detected by the touchless input device 104. Thus, a first virtual object being designated as the commanding object at Block 826 may not necessarily be the commanding object by Block 832. Thus, the determination of a commanding object is fluid and is subject to change according to the movements of the objects detected by the touchless input device 104.

In this manner, the disclosed systems and methods provide a solution whereby a user may interact with a GUI without having to learn any additional gestures or movements. In effect, the user interacts with the GUI intuitively, and the disclosed systems and methods enable a user to quickly configure a touchless input device to work with a computer system and its existing GUI. Thus, the disclosed systems and methods provide a technical advantage over other input devices because they do not require the user to engage a tactile input device nor does it require modifications to the GUI to understand gestures or other complex motions.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

In addition, and unless explicitly stated otherwise, components and functions are optional and may be combined or subdivided, and operations may vary in sequence or be combined or subdivided. In the foregoing description, for purposes of explanation, numerous specific details are set forth to provide a thorough understanding of example embodiments. It will be evident to one skilled in the art, however, that the present subject matter may be practiced without these specific details.

The invention claimed is:

1. A computer-implemented method comprising:
   capturing, with a touchless input device, a first plurality of images corresponding to a plurality of physical objects detected within a physical three-dimensional region;
   establishing, with one or more processors, a virtual three-dimensional region mapped to the physical three-dimensional region, the virtual three-dimensional region defining a space where a plurality of virtual objects are instantiated based on the first plurality of images;
   displaying, on a display in communication with the one or more processors, a second plurality of images, each displayed image corresponding to a different virtual object selected from the plurality of virtual objects;

selecting, with the one or more processors, a virtual object from the plurality of virtual objects as one or more commanding objects, the one or more commanding objects indicating a command of a graphical user interface to be performed based on a position of the commanding object; and performing the command of the graphical user interface based on the position of the one or more commanding objects.

2. The computer-implemented method of claim 1, further comprising:

mapping the virtual-three dimensional region to the physical three-dimensional region by applying a transformation matrix to convert a plurality of coordinates from the physical three-dimensional region to a corresponding plurality of coordinates from the virtual three-dimensional region.

3. The computer-implemented method of claim 1, wherein the plurality of objects captured by the input device comprise a human hand segmented into a plurality of segments.

4. The computer-implemented method of claim 3, wherein the instantiated virtual objects each represent a segment of the human hand or a physical tool being held by the human hand.

5. The computer-implemented method of claim 1, further comprising:

establishing a region of interaction displayed on a display, the region of interaction comprising a two-dimensional plane in which the plurality of virtual objects are displayed as the second plurality of images.

6. The computer-implemented method of claim 5, further comprising applying a transformation matrix to a plurality of coordinates of the virtual three-dimensional region to obtain a plurality of coordinates of the region of interaction.

7. The computer-implemented method of claim 1, further comprising:

displaying at least one image selected from the second plurality of images as having a size that is dependent on its corresponding virtual object, the size of the virtual object being dependent on a distance that its corresponding physical object is located from the graphical user interface.

8. A system comprising:

an input device configured to capture a first plurality of images corresponding to a plurality of physical objects detectable within a physical three-dimensional region;

a non-transitory, computer-readable medium storing computer-executable instructions; and one or more processors in communication with the input device and the non-transitory, computer-readable medium that, having executed the computer-executable instructions, are configured to:

establish a virtual three-dimensional region mapped to the physical three-dimensional region, the virtual three-dimensional region defining a space where a plurality of virtual objects are instantiated based on the first plurality of images;

display, on a display in communication with the one or more processors, a second plurality of images, each displayed image corresponding to a different virtual object selected from the plurality of virtual objects;

select a virtual object from the plurality of virtual objects as one or more commanding objects, the one or more commanding objects indicating a command of a graphical user interface to be performed based on a position of the one or more commanding objects; and perform the command of the graphical user interface based on the position of the commanding object.

9. The system of claim 8, wherein the one or more processors are further configured to:

map the virtual-three dimensional region to the physical three-dimensional region by applying a transformation matrix to convert a plurality of coordinates from the physical three-dimensional region to a corresponding plurality of coordinates from the virtual three-dimensional region.

10. The system of claim 8, wherein the plurality of objects captured by the input device comprise a human hand segmented into a plurality of segments.

11. The system of claim 10, wherein the instantiated virtual objects each represent a segment of the human hand or a physical tool being held by the human hand.

12. The system of claim 8, wherein the one or more processors are further configured to:

establish a region of interaction displayed on a display, the region of interaction comprising a two-dimensional plane in which the plurality of virtual objects are displayed as the second plurality of images.

13. The system of claim 12, wherein the one or more processors are further configured to apply a transformation matrix to a plurality of coordinates of the virtual three-dimensional region to obtain a plurality of coordinates of the region of interaction.

14. The system of claim 8, wherein the one or more processors are further configured to:

display at least one image selected from the second plurality of images as having a size that is dependent on its corresponding virtual object, the size of the virtual object being dependent on a distance that its corresponding physical object is located from the graphical user interface.

15. A non-transitory, computer-readable medium having computer-executable instructions stored thereon that, when executed by one or more processors, cause the one or more processors to perform a method, the method comprising:

receiving a first plurality of images captured by an input device, the first plurality of images corresponding to a plurality of physical objects detected within a physical three-dimensional region;

establishing a virtual three-dimensional region mapped to the physical three-dimensional region, the virtual three-dimensional region defining a space where a plurality of virtual objects are instantiated based on the first plurality of images;

displaying, on a display in communication with the one or more processors, a second plurality of images, each displayed image corresponding to a different virtual object selected from the plurality of virtual objects;

selecting a virtual object from the plurality of virtual objects as one or more commanding objects, the one or more commanding objects indicating a command of a graphical user interface to be performed based on a position of the one or more commanding objects; and performing the command of the graphical user interface based on the position of the one or more commanding objects.

16. The non-transitory, computer-readable medium of claim 15, wherein the method further comprises:

mapping the virtual-three dimensional region to the physical three-dimensional region by applying a first transformation matrix to convert a plurality of coordinates from the physical three-dimensional region to a corresponding plurality of coordinates from the virtual three-dimensional region;

establishing a region of interaction displayed on a display, the region of interaction comprising a two-dimensional plane in which the plurality of virtual objects are displayed; and applying a second transformation matrix to the plurality of coordinates of the virtual three-dimensional region to obtain a plurality of coordinates of the region of interaction.

17. The non-transitory, computer-readable medium of claim 15, wherein the plurality of objects captured by the input device comprise a human hand segmented into a plurality of segments.

18. The non-transitory, computer-readable medium of claim 17, wherein the instantiated virtual objects each represent a segment of the human hand or a physical tool being held by the human hand.

19. The non-transitory, computer-readable medium of claim 15, wherein the method further comprises:

displaying at least one image selected from the second plurality of images as having a size that is dependent on its corresponding virtual object, the size of the virtual object being dependent on a distance that its corresponding physical object is located from the graphical user interface.

* * * * *

UNITED STATES PATENT AND TRADEMARK OFFICE
CERTIFICATE OF CORRECTION

PATENT NO. : 9,501,810 B2
APPLICATION NO. : 14/485407
DATED : November 22, 2016
INVENTOR(S) : André de Almeida Maximo It is certified that error appears in the above-identified patent and that said Letters Patent is hereby corrected as shown below:

On the Title Page

In item (72), in "Inventor", in Column 1, Line 1, delete "Andre" and insert --André--, therefor In the Claims In Column 17, Line 50, in Claim 8, delete "non-transitory;" and insert --non-transitory,--, therefor Signed and Sealed this
Fourth Day of December, 2018

Andrei Iancu
*Director of the United States Patent and Trademark Office*